May 17, 1966     H. C. MUN     3,251,323

ROTATABLE TABLE TOP

Filed April 20, 1964

INVENTOR.
HENRY C. MUN
BY Alexander Riaboff
ATTORNEY

United States Patent Office 3,251,323
Patented May 17, 1966

3,251,323
ROTATABLE TABLE TOP
Henry C. Mun, 162 7th St., Oakland 7, Calif.
Filed Apr. 20, 1964, Ser. No. 360,836
2 Claims. (Cl. 108—139)

This invention relates to a rotatable table top to be used on a dining table.

The object of this invention is to provide a simple, compact and inexpensive means of rotatably supporting a tray with various dishes thereon, whereby the rotating of the tray eliminates the necessity of passing dishes around the table.

Another object of this invention is to provide a tripod, each leg of which carries a bearing on which the tray rests, said tripod also having a pivot bolt around which the tray rotates.

Other objects and advantages will appear as the specification proceeds and the novel features of the device will be particularly pointed out in the claims hereto annexed.

My invention is illustrated in an accompanying drawing forming a part of the specification in which.

Figure 1:
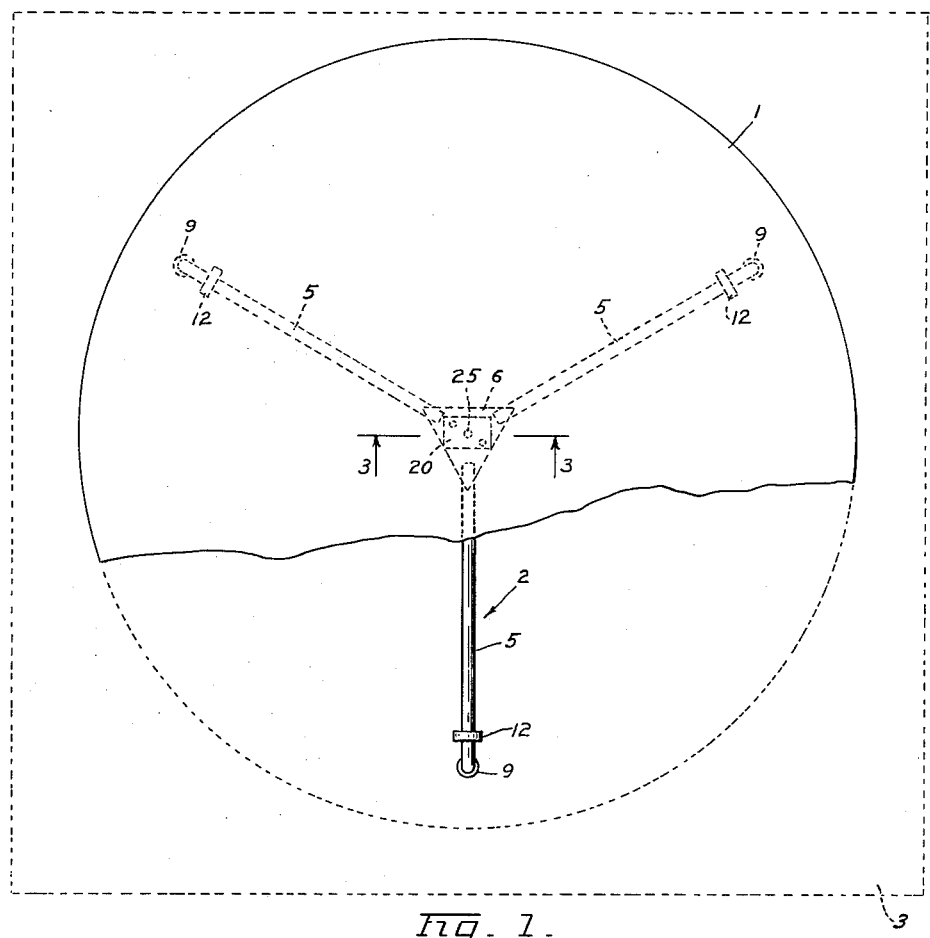
FIG. 1 is a plan view of the device, parts being broken off to disclose the inner mechanism of the device.
Figure 2:
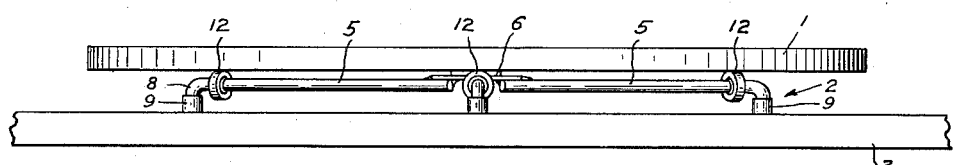
FIG. 2 is a side view of the device.
Figure 3:
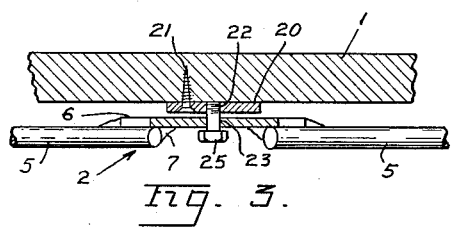
FIG. 3 is a sectional view taken on the line 3—3 of FIG. 2.
Figure 4:
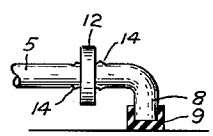
FIG. 4 shows, partly in section, the supporting end of a leg.

In detail, the device includes a round tray 1, which may be made of some light material, such as wood, plastic, plywood, or the like. The diameter of the tray may vary, but preferably is from 24 to 30 inches, with the thickness of about three quarters to seven eighths of an inch. The upper and lower surfaces of the tray are covered with a layer of hard plastic, or other material, if the tray is made of wood or some other comparatively soft material. The tray 1 is rotatably supported by a tripod 2 which in turn rests on a table 3.

The tripod 2 consists of three radially arranged, equally spaced legs 5 made preferably of a round steel rod. The legs 5 are connected by a tripod plate 6.

The latter is in the form of an equilateral triangle, each leg 5 being connected to the apex thereof, preferably by welding, as shown at 7. The legs 5 extend outwardly from the tripod plate 6 parallel to the table 3, and terminate in close vicinity of the outer edge of the tray, the length of each being equal to about 85% of that of the radius of the tray. The outer end of the leg is bent downwardly, as shown at 8, and is enclosed in a rubber cup 9 to protect the table 3 from scratching. The cup 9 may be substituted with a suction cup, if so desired.

Each leg carries a small bearing 12 thereon, arranged near the bent down end 8. The bearing 12 is held in its position by bulges 14 made by notching the leg 5 in the near proximity to the bearing.

The tray 1 rests on the bearings 12 and rides on the same while being rotated about its center.

The tray 1 is held centrally in relation to the tripod 2 by a tray plate 20 secured to the under side of the same by screws 21. The tray plate 20 is provided with a central threaded hole 22.

The tripod plate 6 is formed with a central hole 23 which freely admits a pivot bolt 25. The threaded portion of said bolt is tightly screwed in the hole 22, thus connecting the tripod and the tray. The pivot bolt 25 serves as a pivot around which the tray rotates in relation to the tripod 2 and the table 3 on which the latter rests.

It shall be noted that the tray plate 20 does not rest on the tripod plate 6, and the tray 1 is solely supported by the bearings 12.

In order to connect or disconnect the tripod and the tray, it is only necessary to connect or disconnect the bolt 25 to or from the tray plate 20.

Having thus described this invention, I claim:

1. A rotatable top for a table comprising
   a tray, and
   a stationary tripod for rotatably supporting said tray over a table, including
   a tripod plate
   a plurality of legs secured to the plate and extending radially therefrom and parallel to the table;
   each leg having its outer end bent downwardly for resting on the table;
   a bearing arranged on each leg for rotation about the same near its bent end, said tray resting on said bearings;
   means for centering said tray in relation to the tripod including:
   a tray plate centrally secured to the under side of the tray, said plate having a threaded hole in the center thereof;
   said tripod plate having a centrally located hole; and
   a pivot bolt for passing through the tripod plate hole and for being detachably connected to the tray plate by having its end screwed into the threaded hole therein.

2. A rotatable top for a table comprising
   a tray, and
   a stationary tripod for rotatably supporting said tray over a table, including
   a tripod plate
   a plurality of legs secured to the plate and extending radially therefrom and parallel to the table;
   each leg having its outer end bent downwardly for resting on the table;
   a bearing on each leg for rotatably supporting said tray over said tripod, each leg passing through said bearing and the latter being affixed to the leg near its bent end;
   means for centering said tray in relation to the tripod including:
   a tray plate centrally secured to the under side of the tray, said plate having a threaded hole in the center thereof;
   said tripod plate having a centrally located hole; and
   a pivot bolt for passing through the tripod plate hole and for being detachably connected to the tray plate by having its end screwed into the threaded hole therein.

References Cited by the Examiner

UNITED STATES PATENTS

| | | | |
|---|---|---|---|
| 924,938 | 6/1909 | Richter | 108—139 |
| 1,396,246 | 11/1921 | Bouvier | 108—139 |
| 1,628,013 | 5/1927 | Twedt | 108—139 |
| 1,631,195 | 7/1927 | Ford | 108—50 |
| 2,198,091 | 4/1940 | Rodolfa | 108—139 |
| 2,459,017 | 1/1949 | Crew | 108—139 |
| 2,470,165 | 5/1949 | Hartzler | 108—139 |
| 3,063,714 | 11/1962 | Krauss | 108—139 |

FOREIGN PATENTS 591,194  8/1947  Great Britain.

FRANK B. SHERRY, *Primary Examiner.*